US012782931B2

(12) United States Patent
Ma et al.

(10) Patent No.: US 12,782,931 B2

(45) Date of Patent: Nov. 3, 2026

(54) MULTI-SCALE HYBRID ATTENTION MECHANISM MODELING METHOD FOR AERO-ENGINE REMAINING USEFUL LIFE PREDICTION

(71) Applicant: DALIAN UNIVERSITY OF TECHNOLOGY, Dalian (CN)

(72) Inventors: Song Ma, Dalian (CN); Tao Sun, Dalian (CN); Zhi Li, Dalian (CN); Ximing Sun, Dalian (CN); Zengsong Xu, Dalian (CN)

(73) Assignee: DALIAN UNIVERSITY OF TECHNOLOGY, Dalian (CN)

( * ) Notice: Subject to any disclaimer, the term of this patent is extended or adjusted under 35 U.S.C. 154(b) by 711 days.

(21) Appl. No.: 18/548,192

(22) PCT Filed: Oct. 28, 2022

(86) PCT No.: PCT/CN2022/128100
§ 371 (c)(1),
(2) Date: Aug. 28, 2023

(87) PCT Pub. No.: WO2024/087128
PCT Pub. Date: May 2, 2024

(65) Prior Publication Data

US 2025/0021089 A1 Jan. 16, 2025

(30) Foreign Application Priority Data

Oct. 24, 2022 (CN) ......................... 202211299946.3

(51) Int. Cl.
*G05B 23/02* (2006.01)
*G06F 30/27* (2020.01)
(Continued)

(52) U.S. Cl.
CPC ......... *G05B 23/0283* (2013.01); *G06F 30/27* (2020.01); *B64D 2045/0085* (2013.01); *G06F 2119/04* (2020.01)

(58) Field of Classification Search
CPC ................. G05B 23/0283; G06F 30/27; G06F 2119/04; B64D 2045/0085
See application file for complete search history.

(56) References Cited

U.S. PATENT DOCUMENTS

2022/0187819 A1 6/2022 Shalaby et al.
2023/0350402 A1* 11/2023 Liu ...................... G05B 23/024
2024/0104269 A1* 3/2024 Abbasi .................... G06F 30/27

FOREIGN PATENT DOCUMENTS

CN 113158445 A * 7/2021 ............... G06N 3/04
CN 113641819 A 11/2021
(Continued)

OTHER PUBLICATIONS

Xia, Jun, et al. "Distance self-attention network method for remaining useful life estimation of aeroengine with parallel computing." Reliability Engineering & System Safety 225 (2022): 108636. (Year: 2022).*

*Primary Examiner* — Chuen-Meei Gan
(74) *Attorney, Agent, or Firm* — MUNCY, GEISSLER, OLDS & LOWE, P.C.

(57) ABSTRACT

A multi-scale hybrid attention mechanism modeling method for aero-engine remaining useful life prediction belongs to the field of health management and prediction technology for aero-engines. Firstly, preprocess the data to obtain the sample, set the RUL label, and obtain the true value of the remaining useful life of the sample. Secondly, a multi-scale hybrid attention mechanism model consisting of position encoding layer, feature extraction layer, and regression prediction layer is constructed. Thirdly, train the model, and make the difference between the predicted value output by
(Continued)

the model and the true value of the remaining useful life by minimizing the loss function until it reaches the stop standard. Finally, use the trained model to predict the remaining useful life. The method can achieve full fusion of information from different time steps of a single sample, taking into account the correlation between all samples.

2 Claims, 5 Drawing Sheets

(51) Int. Cl.

| | |
|---|---|
| *B64D 45/00* | (2006.01) |
| *G06F 119/04* | (2020.01) |

(56) References Cited

FOREIGN PATENT DOCUMENTS

| | | | |
|---|---|---|---|
| CN | 113656915 | A | 11/2021 |
| CN | 114297918 | A | 4/2022 |
| CN | 115101085 | A | 9/2022 |

* cited by examiner

MULTI-SCALE HYBRID ATTENTION MECHANISM MODELING METHOD FOR AERO-ENGINE REMAINING USEFUL LIFE PREDICTION

TECHNICAL FIELD

The invention belongs to the field of health management and prediction technology for acro-engines, and relates to a deep learning modeling method for a multi-scale hybrid attention mechanism for aero-engine remaining useful life prediction.

BACKGROUND

As an important component of aircraft, the safety and reliability of acro-engines are crucial. However, due to the fact that most parts work in harsh working environments such as high temperature, high pressure, and high-speed rotation for a long time, the probability of acro-engine failure is high. With the increase of usage time, each component gradually ages, and the failure rate increases, seriously affecting the safe operation of the aircraft. The traditional aero-engine maintenance methods are mainly divided into planned maintenance and post maintenance, which often lead to two situations: "over repair" and "out of repair". This not only causes serious resource waste, but also fails to eliminate potential safety hazards of aviation engines. The effective method to solve this problem is mainly to propose a data-driven machine learning or deep learning model based on historical sensor data of acro-engines, in order to predict the remaining useful life of aero-engines. Provide decision-making support for ground systems, assist ground maintenance personnel in engine maintenance work, ensure aircraft safety performance, and avoid waste of manpower and material resources caused by "excessive maintenance".

At present, there are several methods for aero-engine remaining useful life prediction:

1) Prediction Method Based on Convolutional Neural Network

In this method, samples are constructed by sliding time windows on the historical sensor data of aero-engines, and then features are extracted by convolutional neural network. Finally, the remaining useful life is predicted through the full connection layer. Convolutional neural network is a kind of feedforward neural network through convolution calculation, which is inspired by the mechanism of receptive field in biology. It has translation invariance, uses convolution kernel, makes maximum use of local information, and retains plane structure information. However, in all time steps of historical sensor data, the receptive field is limited by the size of convolution kernel, so it is unable to mine the correlation between two groups of data that are far away in time dimension, and its prediction ability is relatively limited.

2) Prediction Method Based on Long Short-Term Memory Neural Network

This method also uses the sliding time window to construct samples on the aero-engine historical sensor data, then extracts features through the long short-term memory neural network, and finally introduces the full connection layer to predict the remaining useful life. Long short-term memory neural networks design the flow and loss of historical data characteristics by introducing a gating mechanism, which solves the long-term dependence problem of traditional recurrent neural network. Although the long short-term memory neural network can make full use of the timing information, the information of each time step is serially connected, the parallelism is poor, and the training and prediction take a long time. At the same time, because the weight of each time step is not considered, there is more redundant information, which ultimately affects the prediction ability.

Based on the above discussion, the multi-scale hybrid attention mechanism deep learning model designed by the invention is capable of accurately predicting the remaining useful life of acro-engines with coupled time series data. This patent is supported by the China Postdoctoral Science Foundation (2022TQ0179) and the National Key Research and Development Program (2022YFF0610900).

Invention Content

The invention provides a multi-scale hybrid attention mechanism model to solve the limitations of convolutional neural network and long short-term memory neural network in the prediction of the remaining useful life of aero-engines, and achieves better prediction accuracy. Due to the fact that aero-engines are highly complex and precise aerodynamic thermodynamic mechanical systems, the time series data generated by their sensors have strong temporal correlation, coupling, and multimodal characteristics. Therefore, predicting the remaining useful life of aero-engines in a constantly changing full envelope environment has always been a challenging challenge.

In order to achieve the above objectives, the technical solution adopted by the invention is:

A multi-scale hybrid attention mechanism modeling method for aero-engine remaining useful life prediction (the method flowchart is shown in FIG. 1), comprising an off-line training stage and an on-line testing stage, wherein a multi-scale hybrid attention mechanism model is trained using aero-engine historical sensor data at the off-line training stage, and the remaining useful life is predicted using the trained multi-scale hybrid attention mechanism model according to the real-time data collected by the aero-engine sensor at the on-line testing stage.

The specific steps are as follows:

Step 1: Data Preprocessing 1.1) Analyzing the correlation between the original data and the remaining useful life of the aero-engine sensor, and if the value of the original data of a sensor is constant and does not change with the increase of the number of flight cycles, eliminating the original data of the sensor to realize data dimension reduction;

1.2) Carrying out standardization of the time series data generated by the selected sensor using the following standardization formula:

$$z = \frac{x - \mu}{\delta} \tag{1}$$

wherein, x is the original time series data generated by various sensors of the aero-engine, μ is the mean of the original time series data, δ is the variance of the original time series data, z is standardized time series data.

1.3) Constructing a sample by a sliding time window on the standardized time series data; definitions: $fi_j$ indicates the value of the $j^{th}$ time step after standardization of the data from the $i^{th}$ sensor of the aero-engine, the dimension of the aero-engine sensor data is k, the length of the time series is m, the size of the sliding time window is n, the sliding step size is 1, sliding is performed along the direction of time increase, and the form of the finally constructed sample is $X\in\mathbb{R}^{n*k}$.

Step 2: Setting a RUL Label

For the last piece of data in the sample $X\in\mathbb{R}^{n*k}$ constructed in step 1.3, the last piece of data here refers to the $n^{th}$ piece of data, selecting the smaller of the difference between the total number $Cycle_{total}$ of flight cycles and the current number $Cycle_{cur}$ of flight cycles and the threshold value $RUL_{TH}$ of the remaining useful life, and calculating the remaining useful life $RUL_{label}$:

$$RUL_{label}=\min(Cycle_{total}-Cycle_{cur},\ RUL_{TH}) \tag{2}$$

$RUL_{label}$ is taken as the true value of the remaining useful life of the sample and will be used in training in step 4.

Step 3: Constructing a Multi-Scale Hybrid Attention Mechanism Model

The network structure of the multi-scale hybrid attention mechanism model (the network structure diagram is shown in FIG. 3*a*) comprises a position encoding layer, a feature extraction layer and a regression prediction layer;

(3.1) Position Encoding Layer

Firstly, mapping the sample $X\in\mathbb{R}^{n*k}$ to a higher dimensional space $Y\in\mathbb{R}^{n*d}$ through a linear layer so that the data dimension d can be evenly divided by the number H of subsequent attention heads:

$$Y=XW_Y \tag{3}$$

wherein $W_Y\in\mathbb{R}^{k*d}$ is a trainable projection matrix;

Then, adding sine-cosine position encoding to obtain $U\in\mathbb{R}^{n*d}$ as the input of step 3.2, wherein the values of positions in the position encoding matrix $P\in\mathbb{R}^{n*d}$ are as follows:

$$P_{i,2j}=\sin\left(\frac{i}{10000^{2j/d}}\right) \qquad P_{i,2j+1}=\cos\left(\frac{i}{10000^{2j/d}}\right) \tag{4}$$

wherein $P_{i,2j}$ is the value of the $2j^{th}$ column in the $i^{th}$ row of the encoding matrix P; $P_{i,2j+1}$ is the value of the $2j+1^{th}$ column in the $i^{th}$ row of the encoding matrix P; $i\in[0,n-1]$ indicates the number of rows; and $$j\in\left[0,\left\lfloor\frac{d-1}{2}\right\rfloor\right]$$

indicates the number of columns;

(3.2) Feature Extraction Layer

The feature extraction layer comprises two parts: a multi-head hybrid attention mechanism and a multi-scale convolutional neural network, and residual connection and layer normalization are added simultaneously at the end positions of the two parts to suppress overfitting; the multi-head hybrid attention mechanism is formed by mixing a multi-head self attention mechanism and a multi-head external attention mechanism.

① The Multi-Head Self Attention Mechanism

Firstly, mapping the result $U\in\mathbb{R}^{n*d}$ obtained in step 3.1 as input to 3 subspaces: query Q, key K and value V through the linear layer:

$$Q=UW_Q \qquad K=UW_K \qquad V=UW_V \tag{5}$$

wherein $W_Q$, $W_K$, $W_V\in\mathbb{R}^{d*d}$ is the trainable projection matrix. Then split them into H attention heads:

$$Q=[Q_1,Q_2,\cdots,Q_H] \qquad K=[K_1,K_2,\cdots,K_H] \qquad V=[V_1,V_2,\cdots,V_H] \tag{6}$$

wherein $$Q_i,K_i,V_i\in\mathbb{R}^{n*\left(\frac{d}{H}\right)}$$

are the query, key and value of the $i^{th}$ attention head;

Then, conducting dot product operation of the query $Q_i$ and the key $K_i$ in each attention head, performing zooming by dividing by the square root of the data dimension d, carrying out index normalization by column and then multiplying by the value $V_i$ to obtain the result of a single attention head;

$$SelfAttention(Q_i,K_i,V_i)=\text{softmax}\left(\frac{Q_iK_i^T}{\sqrt{d}}\right)V_i \tag{7}$$

Finally, splicing the results of the attention heads to obtain a final result MultiHeadSelfAttention, so as to realize feature extraction of the correlation among data by the multi-head self attention mechanism at different time steps;

$$MultiHeadSelfAttention=Concat(\{\text{head}\}_{i=1}^{H})W_O \tag{8}$$

wherein $head_i=SelfAttention(Q_i,K_i,V_i)$, and $W_O\in\mathbb{R}^{d*d}$ is a trainable projection matrix;

Firstly, mapping the result $U\in\mathbb{R}^{n*d}$ obtained in step 3.1 as input to the query subspace Q through the linear layer:

$$Q=UW_Q \tag{9}$$

wherein $W_Q\in\mathbb{R}^{d*d}$ is the trainable projection matrix. Then split it into H attention heads:

$$Q=(Q_1,Q_2,\cdots,Q_H] \tag{10}$$

wherein $$Q_i \in \mathbb{R}^{n*\left(\frac{d}{H}\right)}$$

is the query of the $i^{th}$ attention head;

Then, conducting dot product operation of the query and the external key memory unit in each attention head, carrying out standardization, and then multiplying by the external key memory unit to obtain the result of a single attention head:

$$ExternalAttention(Q_i) = Norm\left(Q_i M_K^T\right) M_V \quad (11)$$

wherein the standardization is double normalization, that is to carry out index normalization by column and then carry out normalization by column:

$$\hat{\alpha}_{i,j} = \exp(\tilde{\alpha}_{i,j}) / \Sigma_k \exp(\tilde{\alpha}_{k,j}) \quad (12)$$
$$\alpha_{i,j} = \hat{\alpha}_{i,j} / \Sigma_k \hat{\alpha}_{i,k}$$

wherein $\tilde{\alpha}_{i,j}$ is the value in row i and column j of the original data, and $\alpha_{i,j}$ is the value in row i and column j of the normalized data.

Finally, splicing the results of the attention heads to obtain a final result MultiHeadExternalAttention, so as to realize feature extraction of the correlation among data by the multi-head external attention mechanism at different time steps;

$$MultiHeadExternalAttention = Concat\left(\{\text{head}_i\}_{i=1}^{H}\right) W_O \quad (13)$$

wherein $\text{head}_i$=ExternalAttention($Q_i$), and $W_O \in \mathbb{R}^{d*d}$ is a trainable projection matrix;

③ The multi-head hybrid attention mechanism formed by mixing a multi-head self attention mechanism and a multi-head external attention mechanism. Unlike traditional single attention mechanisms, the multi-head hybrid attention mechanism combines two different attention mechanisms, retaining the excellent temporal correlation feature extraction ability of the self attention mechanism for single sample data. Additionally, due to the introduction of shared external key memory units and external value memory units on the entire dataset, the correlation between different samples is considered, the ability of attention mechanism to summarize temporal data is improved.

Firstly, setting a trainable parameter $\alpha \in \mathbb{R}^{1*2}$, wherein $\alpha = [\alpha_1, \alpha_2]$ and the initial value is 1, then carrying out index normalization, and finally, using the parameter to conduct weighted summation of the feature MultiHeadSelfAttention extracted by the multi-head self attention mechanism and the feature MultiHeadExternalAttention extracted by the multi-head external attention mechanism to obtain a final result HybridAttention:

$$HybridAttention = \frac{\exp(\alpha_1)}{\exp(\alpha_1) + \exp(\alpha_2)} MultiHeadSelfAttention + \quad (14)$$

-continued $$\frac{\exp(\alpha_2)}{\exp(\alpha_1) + \exp(\alpha_2)} MultiHeadExternalAttention$$

④ The multi-scale convolutional neural network does not contain a pooling layer or a fully connected layer, only uses multiple convolutional kernels of different sizes for feature extraction of time series data, and integrates the results to enhance the local feature extraction capability of the data;

Taking the feature HybridAttention extracted by the multi-head hybrid attention mechanism as the input, firstly, using three convolutional kernels of different sizes (1*1, 1*3 and 1*5) to extract features respectively, and then, setting a learnable parameter $\beta \in \mathbb{R}^{1*3}$, wherein the initial value is 1, and the parameter $\beta$ will be subjected to gradient update during training in step 4; and carrying out index normalization of the parameter $\beta$, and finally using the parameter to conduct weighted summation of the features extracted by three convolutional kernels to obtain a final result MultiScaleConv:

$$MultiScaleConv = \sum_{i=1}^{3} \frac{\exp(\beta_i)}{\sum_{i=1}^{3} \exp(\beta_j)} Conv_{k_i j}(X) \quad (15)$$

wherein $Conv_{k_i}(X)$ is the feature extracted by the $i^{th}$ convolutional kernel;

(3.3) Regression Prediction Layer

Firstly, expanding the result $MultiScaleConv \in \mathbb{R}^{n*d}$ obtained in step 3.2 as $F \in \mathbb{R}^{1*(n*d)}$, and then, calculating the result through a two-layer fully connected neural network to obtain the predicted value RUL of the remaining useful life of an aero-engine:

$$RUL = Relu(FW_2 + b_1)W_2 + b_2 \quad (16)$$

wherein $W_1 \in \mathbb{R}^{(n*d)*d_1}$ is the projection matrix of the first layer of fully connected neural network, $b_1 \in \mathbb{R}^{1*d_1}$ is the bias of the first layer of fully connected neural network, $W_2 \in \mathbb{R}^{d_1*1}$ is the projection matrix of the second layer of fully connected neural network, $b_2 \in \mathbb{R}^{1*1}$ is the bias of the second layer of fully connected neural network, the projection matrixes and the biases are both trainable, and Relu is an activation function;

$$Relu(x) = \max(x, 0) \quad (17)$$

Step 4: Training the Model

Gradually reducing the difference between the predicted value RUL and the true value of the remaining useful life output by the model by minimizing the loss function until the stopping standard is reached, wherein the true value is an RUL label $RUL_{label}$ set in step 2; and the loss function is a mean square error (MSE) loss function;

$$MSE = \frac{1}{n} \sum_{i=1}^{N} \left(RUL_i - R\hat{U}L_i\right)^2 \quad (18)$$

wherein n is the number of samples, $RUL_i$ is the true value of the remaining useful life of the $i^{th}$ sample, and $\widehat{RUL}_i$ is the predicted value of the remaining useful life of the $i^{th}$ sample;

Firstly, inputting the samples obtained in step 1.3 into the multi-scale hybrid attention mechanism model constructed in step 1.3 in batches to obtain the predicted value RUL, then calculating the MSE loss value, and conducting gradient update of the model using an adaptive moment estimation optimizer to complete an iterative training session; and setting the total number of model training iterations, and iteratively training the model several times;

Step 5: Predicting the Remaining Useful Life Using the Trained Model

At the on-line testing stage, calculating the output value by preprocessing the data in step 1 and inputting the data into the multi-scale hybrid attention mechanism model trained in step 4 according to the real-time data collected by the aero-engine sensor, wherein the output value is the predicted value of the remaining useful life of the aero-engine.

The Beneficial Effects of the Invention

The multi-scale hybrid attention mechanism model adopted by the invention fully considers the natural relationship of mutual coupling and influence between aero-engine data. Firstly, the self attention mechanism first obtains attention weights by calculating the correlation between query vectors and key vectors, and then uses this attention weight and value vector weighting to obtain feature maps, achieving full fusion of information from different time steps of a single sample. Secondly, the external attention mechanism introduces external key and value memory units, which are shared across the entire dataset, allowing for the correlation between all samples. Simultaneously introducing a multi-head mechanism not only achieves information feature extraction for different subspaces of data, but also increases the parallelism of the algorithm. Finally, multi-scale convolutional neural network enhances the ability to extract local features of data due to the use of convolutional kernels with different sizes. So this model can more accurately predict the remaining useful life of acro-engines.

SPECIFIC IMPLEMENTATION METHODS

Figure 1:
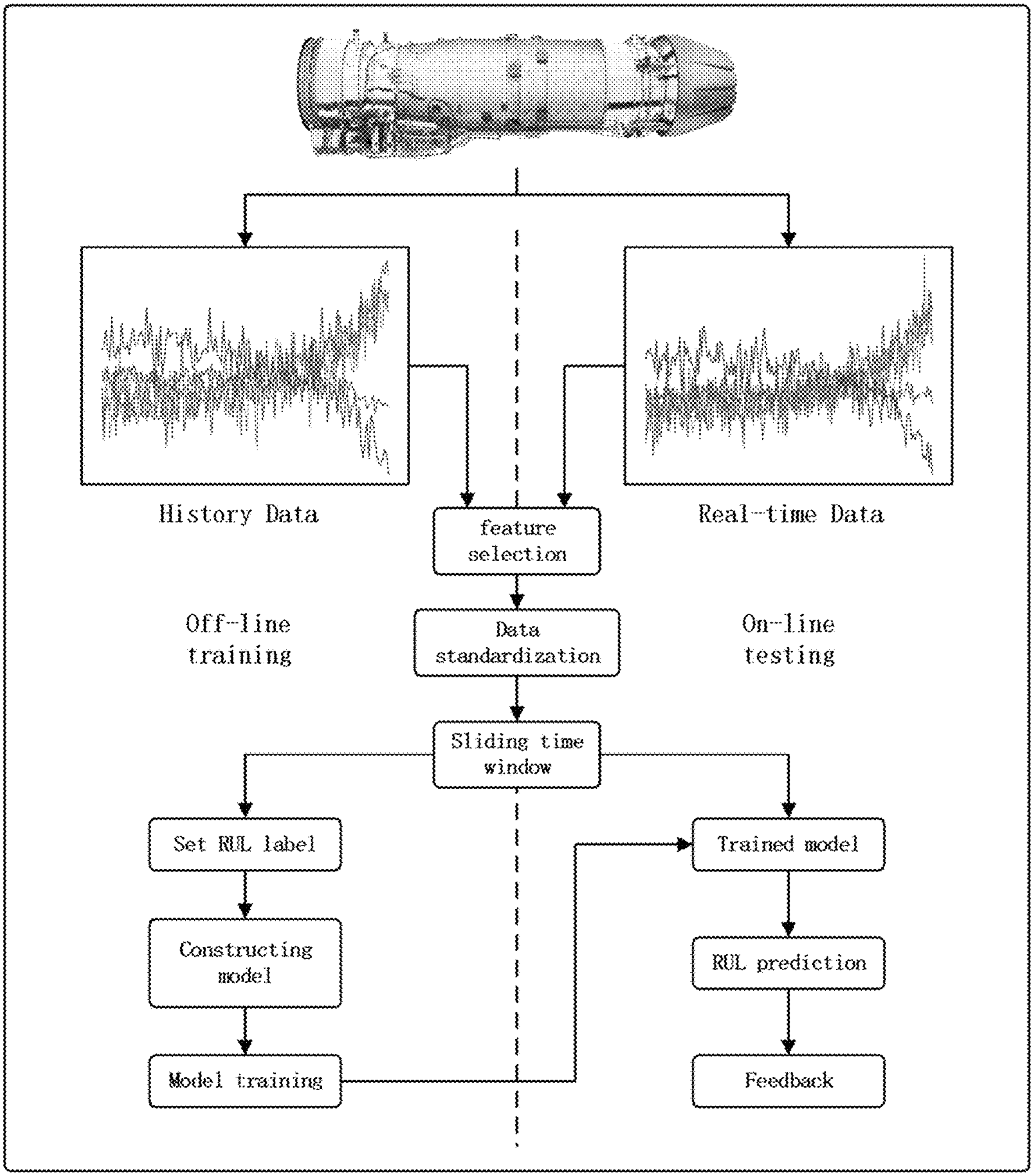
FIG. 1 is the flowchart of the multi-scale hybrid attention mechanism modeling method.
Figure 2:
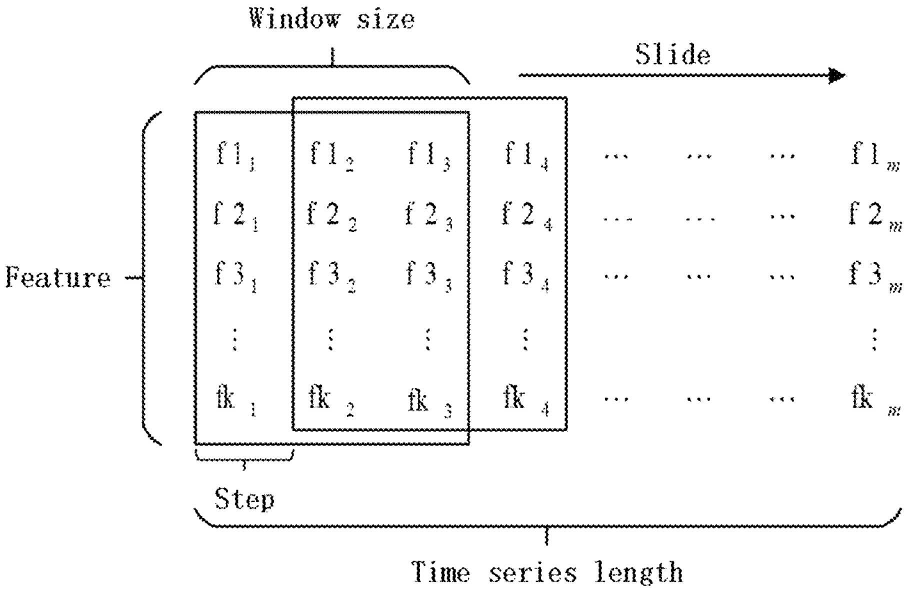
FIG. 2 is a schematic diagram of constructing samples using a sliding time window.
Figure 3:
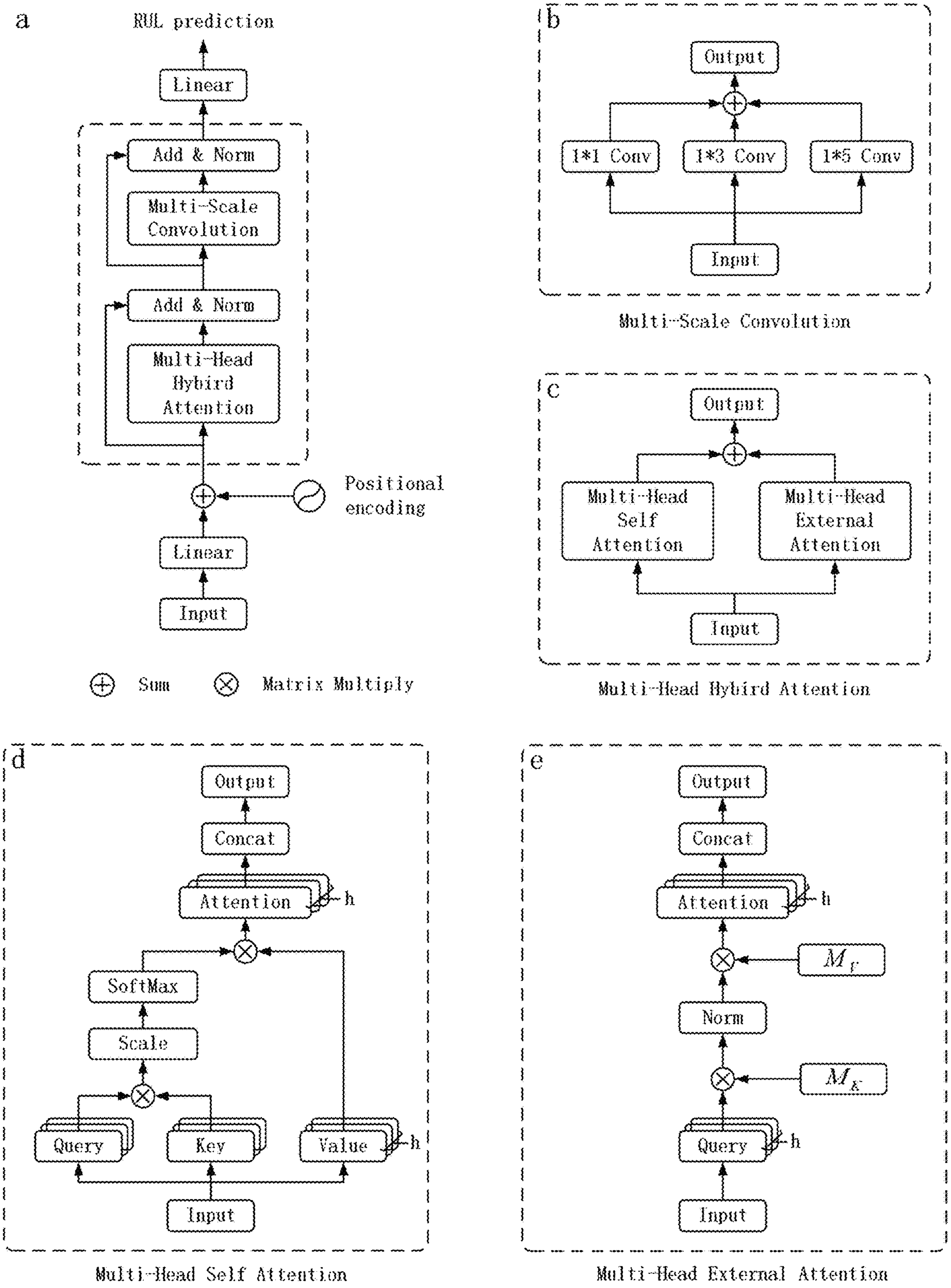
FIG. 3 is the network structure diagram of the multi-scale hybrid attention mechanism model, where (a) is the overall network structure diagram of the model, (b) is the network structure diagram of the multi-scale convolutional neural network, (c) is the network structure diagram of the multi-head hybrid attention mechanism, (d) is the network structure diagram of the multi-head self attention mechanism, and (e) is the network structure diagram of the multi-head external attention mechanism.

The following will further explain the specific implementation method of the invention in conjunction with the accompanying drawings and technical solutions.

The invention uses a subset of FD001 from the C-MAPSS dataset for the degradation simulation of turbofan engines, which is divided into a training set and a testing set. The training set contains all data information from the initial state of the engine to the time of complete failure, while the testing set only contains data from the first part of the engine's life cycle. This data set contains 26 columns of data, the first column is the engine unit number, the second column is the number of engine cylce number, and the third to fifth columns are the engine operating conditions, which are flight altitude, Mach number and throttle lever angle respectively. The remaining 21 columns of data are monitoring data from various sensors in the engine, as follows:

TABLE 1

Aero-engine sensor parameter information

| Num | Symbol | Description |
|---|---|---|
| 1 | T2 | Total temperature at fan inlet |
| 2 | T24 | Total temperature at LPC outlet |
| 3 | T30 | Total temperature at HPC outlet |
| 4 | T50 | Total temperature at LPT outlet |
| 5 | P2 | Pressure at fan inlet |
| 6 | P15 | Total pressure in bypass-duct |
| 7 | P30 | Total pressure at HPC outlet |
| 8 | Nf | Physical fan speed |
| 9 | Nc | Physical core speed |
| 10 | epr | Engine pressure ratio (P50/P2) |
| 11 | Ps30 | Static pressure at HPC outlet |
| 12 | phi | Ratio of fuel flow to Ps30 |
| 13 | NRf | Corrected fan speed |
| 14 | NRc | Corrected core speed |
| 15 | BPR | Bypass Ratio |
| 16 | farB | Burner fuel-air ratio |
| 17 | htBleed | Bleed Enthalpy |
| 18 | Nf_dmd | Demanded fan speed |
| 19 | PCNfR_dmd | Demanded corrected fan speed |
| 20 | W31 | HPT coolant bleed |
| 21 | W32 | LPT coolant bleed |

EXAMPLE

Step 1: For the FD001 training set and test set, first analyze the correlation between the original data of the aero-engine sensor and the remaining useful life. Since the values of sensors 1, 5, 6, 10, 16, 18, and 19 are constant and do not change with the increase of the number of flight cycle number, so select the remaining 14 sensor data, then conduct Z-Score standardization for each column of sensor data, and finally construct samples through the sliding time window, The sliding window size is 30, with a step size of 1, and the final constructed sample form is $X \in \mathbb{R}^{30*14}$.

Step 2: For the last data (i.e. the 30th data) in the sample $X \in \mathbb{R}^{30*14}$ constructed in step 1, calculate the remaining useful life of the sample as the remaining useful life of the sample by comparing the difference between the total flight cycle number $Cycle_{total}$ and the current flight cycle number $Cycle_{cur}$ with the remaining useful life threshold $RUL_{TH}$, whichever is smaller. wherein $RUL_{TH}$ is 125.

Step 3: For the FD001 training set, first map the constructed sample X to a higher dimensional space Y through a linear layer, and then add sine cosine position encoding to obtain U. Then, use the multi-head self attention mechanism and the multi-head external attention mechanism to extract features related to data at different time steps, and then weight and sum the features extracted by these two attention mechanisms to form a hybrid attention mechanism, next, multi-scale convolutional neural network is used to further extract features, and finally, the features are expanded, and the prediction value of acro-engine remaining useful life (RUL) is obtained through the calculation results of two-layer fully connected neural network, completing the construction of multi-scale hybrid attention mechanism model. Wherein $Y\in \mathbb{R}^{30*128}$, the number of attention heads is 8, the projection matrix of the first fully connected neural network is $W_1\in \mathbb{R}^{(30*128)*64}$, the bias of the first fully connected neural network is $b_1\in \mathbb{R}^{1*64}$, the projection matrix of the second fully connected neural network is $W_2\in \mathbb{R}^{64*1}$, and the bias of the second fully connected neural network is $b_2\in \mathbb{R}^{1*1}$.

Step 4: For the FD001 training set, first input the batch of samples constructed in Step 1 into the multi-scale hybrid attention mechanism model constructed in Step 3, calculate the predicted remaining useful life (RUL) of the aero-engine, and then calculate the MSE loss value based on the RUL predicted value and the RUL label set in Step 2. Then, use the Adaptive Moment Estimation (Adma) optimizer to perform gradient updates on the model and complete an iterative training. Finally, the model was trained repeatedly, with batch size of 128, Learning rate of 0.0003, and total iterations of 50.

Step 5: For the FD001 test set, input the samples constructed in Step 1 into the multi-scale hybrid attention mechanism model trained in Step 4, and calculate the predicted remaining useful life (RUL) of the aircraft engine.

Implemented Results

The FD001 subset in the C-MAPSS dataset for turbofan engine degradation simulation is taken as the research object for example analysis. This data set simulates the degradation process of five main turbofan engine components, namely, low-pressure turbine (LPT), high-pressure turbine (HPT), low-pressure compressor (LPC), high-pressure compressor (HPC) and fan (Fan), to obtain the performance degradation data of each flight cycle number of the engine under different working conditions. All data is generated through the thermodynamic simulation model of the turbofan engine, and the specific sensor parameters of the turbofan engine are shown in Table 1. The dataset is divided into a training set and a testing set. The training set is used to train the model, and the testing set is used to verify the prediction accuracy of the model. The evaluation indicators for the prediction of aero-engine remaining useful life (RUL) are root mean square error (RMSE) and Score:

$$RMSE = \sqrt{\frac{1}{n}\sum_{i=1}^{n} h_i^2} \tag{19}$$

$$\text{Score} = \begin{cases} \sum_{i=0}^{n}\left(e^{-\frac{h_i}{13}} - 1\right), & h_i < 0 \\ \sum_{i=0}^{n}\left(e^{\frac{h_i}{10}} - 1\right), & h_i \geq 0 \end{cases} \tag{20}$$

Wherein n is the number of samples, i is the sample number, and $h_i$ is the difference between the RUL predicted value and the actual value. The RMSE indicator has the same degree of punishment for RUL predicted values greater than or less than the true value, while the Score indicator has a higher degree of punishment for RUL predicted values greater than the true value, which is more in line with the actual situation. Overestimating RUL often leads to more serious consequences. The smaller the RMSE and Score values of the prediction results, the higher the prediction accuracy.

Accurate prediction of remaining useful life can predict the failure time of aero-engines in advance, providing decision-making support for ground systems, assisting ground maintenance personnel in engine maintenance work, ensuring aircraft safety performance, and avoiding the waste of manpower and material resources caused by traditional planned maintenance.

The comparison between the evaluation indicators of the prediction results of the multi-scale hybrid attention mechanism model of the invention on the FD001 dataset and other methods is as follows:

TABLE 2

Comparison of evaluation indicators for prediction results using different methods on the FD001 dataset

| Method | RMSE | Score |
|---|---|---|
| comparative example: CNN | 18.45 | 1290 |
| comparative example: LSTM | 16.14 | 338 |
| the invention: multi-scale hybrid attention mechanism | 9.35 | 119 |

Figure 4:
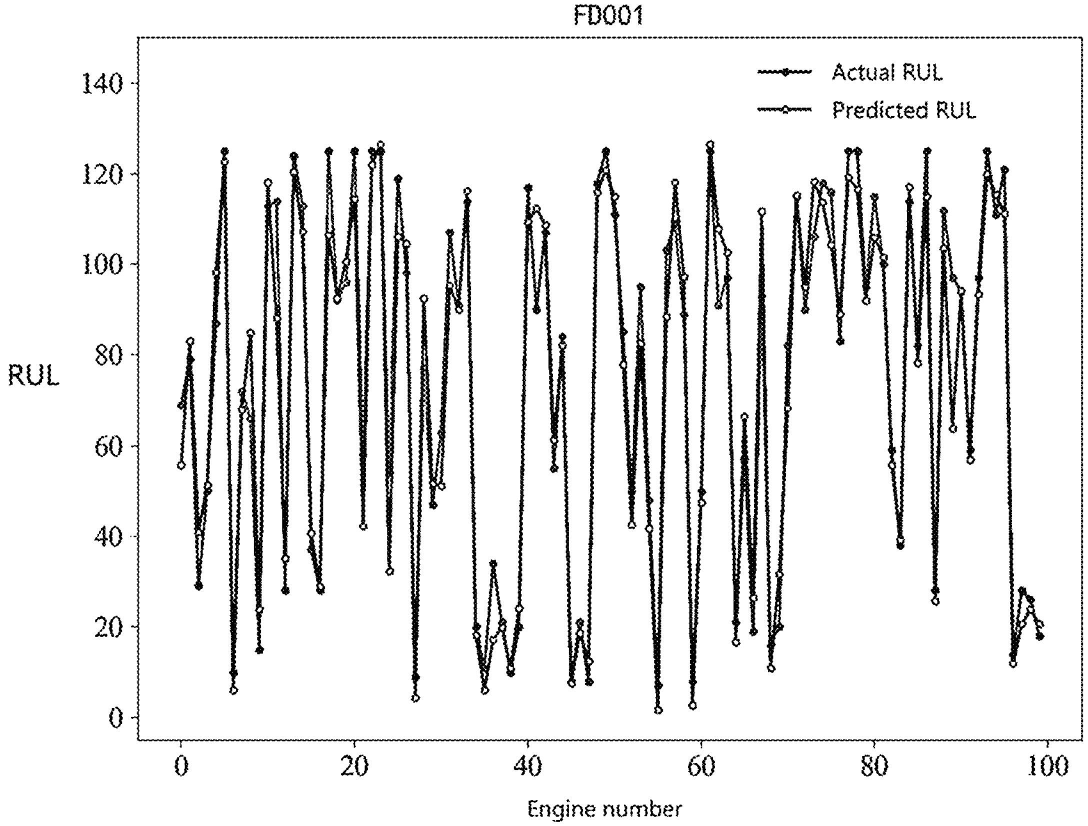
FIG. 4 shows the prediction results of the multi-scale hybrid attention mechanism model on the FD001 dataset. Note: The solid points in the figure represent the true value of the remaining service life of the aircraft engine, while the hollow points represent the predicted value of the remaining useful life of the aero-engine.
Figure 5:
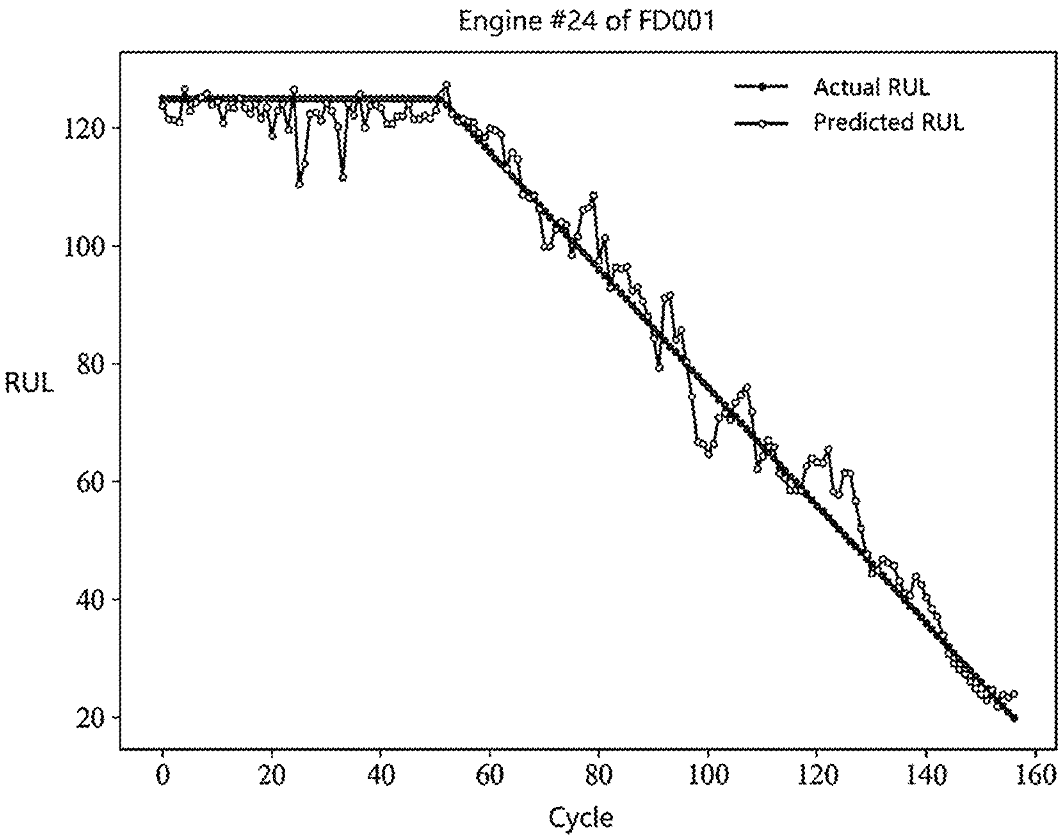
FIG. 5 shows the prediction results of the multi-scale hybrid attention mechanism model on the 24th engine data in the FD001 dataset. Note: The solid points in the figure represent the true value of the remaining service life of the aircraft engine, while the hollow points represent the predicted value of the remaining useful life of the aero-engine.

1) It can be seen from Table 2 that compared with the convolutional neural network model and the long short-term memory neural network model, the prediction results of the multi-scale hybrid attention mechanism model proposed by the invention on the FD001 dataset have smaller RMSE values and Score values, and the prediction accuracy is higher.
2) From FIG. 4, it can be seen that for the 100 aircraft engines in the FD001 dataset, a multi-scale hybrid attention mechanism model was used to predict the remaining useful life, and the predicted values were very close to the actual values, reflecting the excellent predictive performance of the model.
3) From FIG. 5, it can be seen that for a single aero-engine, the predicted remaining useful life fluctuates in a small range near the true value, which is in line with the actual performance degradation trend of aero-engines. And with the increase of flight cycle number, the prediction accuracy of the model is higher.

Therefore, such results conform to the essential characteristics of multi-scale hybrid attention mechanism models. It also proves that the multi-scale hybrid attention mechanism model has more accurate prediction ability for the remaining useful life of aero-engines.

Although the example of the invention has been shown and described above, it can be understood that the above example is only used to illustrate the technical solution of the present invention and cannot be understood as a limitation of the present invention. Ordinary technical personnel in the art can modify and replace the above embodiments within the scope of the present invention without departing from the principles and purposes of the present invention.

The invention claimed is:

1. A multi-scale hybrid attention mechanism modeling method for aero-engine remaining useful life (RUL) prediction, comprising an off-line training stage and an on-line testing stage, wherein a multi-scale hybrid attention mechanism model is trained using aero-engine historical sensor data at the off-line training stage, and the remaining useful life is predicted using the trained multi-scale hybrid attention mechanism model according to the real-time data collected by the aero-engine sensor at the on-line testing stage; comprising the following steps:

step 1: preprocessing the data to finally obtain a sample $X \in \mathbb{R}^{n \times k}$, wherein k is the dimension of aero-engine sensor data, and n is the size of a sliding time window; wherein in step 1, the step of preprocessing the data comprises the following specific steps:

1.1) analyzing the correlation between the original data and the remaining useful life of the aero-engine sensor, and if the value of the original data of a sensor is constant and does not change with the increase of the number of flight cycles, eliminating the original data of the sensor to realize data dimension reduction;

1.2) carrying out standardization of the time series data generated by the selected sensor;

1.3) constructing a sample by a sliding time window on the standardized time series data; definitions: $f_{ij}$ indicates the value of the $i^{th}$ time step after standardization of the data from the $i^{th}$ sensor of the aero-engine, the dimension of the aero-engine sensor data is k, the length of the time series is m, the size of the sliding time window is n, the sliding step size is 1, sliding is performed along the direction of time increase, and the form of the finally constructed sample is $X \in \mathbb{R}^{n \times k}$;

step 2: setting a RUL label for the last piece of data in the sample $X \in \mathbb{R}^{n \times k}$ constructed in step 1.3, the last piece of data here refers to the $n^{th}$ piece of data, selecting the smaller of the difference between the total number $Cycle_{total}$, of flight cycles and the current number $Cycle_{cur}$ of flight cycles and the threshold value $RUL_{TH}$ of the remaining useful life, and calculating the remaining useful life $RUL_{label}$;

$$RUL_{label} = \min(Cycle_{total} - Cycle_{cur}, RUL_{TH}) \tag{2}$$

$RUL_{label}$ is taken as the true value of the remaining useful life of the sample and will be used in training in step 4;

step 3: constructing a multi-scale hybrid attention mechanism model the network structure of the multi-scale hybrid attention mechanism model comprises a position encoding layer, a feature extraction layer and a regression prediction layer;

(3.1) position encoding layer firstly, mapping the sample $X \in \mathbb{R}^{n \times k}$ to a higher dimensional space $Y \in R^{n \times d}$ through a linear layer so that the data dimension d can be evenly divided by the number H of subsequent attention heads:

$$Y = XW_Y \tag{3}$$

wherein $W_Y \in \mathbb{R}^{k \times d}$ is a trainable projection matrix;

then, adding sine-cosine position encoding to obtain $U \in \mathbb{R}^{n \times d}$ as the input of step 3.2, wherein the values of positions in the position encoding matrix $P \in \mathbb{R}^{n \times d}$ are as follows;

$$P_{i,2j} = \sin\left(\frac{i}{10000^{2j/d}}\right) \tag{4}$$

$$P_{i,2j+1} = \cos\left(\frac{i}{10000^{2j/d}}\right)$$

wherein $P_{i2,i}$ is the value of the $2j^{th}$ column in the $l^{th}$ row of the encoding matrix P;

$P_{i,2i+1}$ is the value of the $2j+1^{th}$ column in the $i^{th}$ row of the encoding matrix P;

$i \in [0, n-1]$ indicates the number of rows; and $$j \in \left[0, \left\lfloor \frac{d-1}{2} \right\rfloor\right]$$

indicates the number of columns;

(3.2) feature extraction layer the feature extraction layer comprises two parts: a multi-head hybrid attention mechanism and a multi-scale convolutional neural network, and residual connection and layer normalization are added simultaneously at the end positions of the two parts to suppress overfitting;

the multi-head hybrid attention mechanism is formed by mixing a multi-head self attention mechanism and a multi-head external attention mechanism, obtaining a feature HybridAttention the multi-scale convolutional neural network does not contain a pooling layer or a fully connected layer, only uses multiple convolutional kernels of different sizes for feature extraction of time series data, and integrates the results to enhance the local feature extraction capability of the data;

taking the feature HybridAttention extracted by the multi-head hybrid attention mechanism as the input, firstly, using three convolutional kernels of different sizes to extract features respectively, and then, setting a learnable parameter $\beta \in \mathbb{R}^{1 \times 3}$, wherein the initial value is 1, and the parameter β will be subjected to gradient update during training in step 4; and carrying out index normalization of the parameter β, and finally using the parameter to conduct weighted summation of the features extracted by three convolutional kernels to obtain a final result MultiScaleConv:

$$MultiScaleConv = \sum_{i=1}^{3} \frac{\exp(\beta_i)}{\sum_{j=1}^{3} \exp(\beta_j)} Conv_{k_i}(X) \tag{15}$$

wherein $Conv_{k_1}(X)$ is the feature extracted by the $i^{th}$ convolutional kernel;

(3.3) regression prediction layer firstly, expanding the result $MultiScaleConv \in \mathbb{R}^{n \times d}$ obtained in step 3.2 as $F \in \mathbb{R}^{1 \times (n \times d)}$, and then, calculating the result through a two-layer fully connected neural network to obtain the predicted value RUL of the remaining useful life of an aero-engine:

$$RUL = Relu(FW_2 + b_1)W_2 + b_2 \tag{16}$$

wherein $W_1 \in \mathbb{R}^{(n\times d)\times d}$ is the projection matrix of the first layer of fully connected neural network, $b_1 \in \mathbb{R}^{1\times d}$ is the bias of the first layer of fully connected neural network, $W_2 \in \mathbb{R}^{d1+1}$ is the projection matrix of the second layer of fully connected neural network, $b_2 \in \mathbb{R}^{1+1}$ is the bias of the second layer of fully connected neural network, the projection matrixes and the biases are both trainable, and Relu is an activation function;

step 4: training the model gradually reducing the difference between the predicted value RUL and the true value of the remaining useful life output by the model by minimizing the loss function until the stopping standard is reached, wherein the true value is an RUL label $RUL_{label}$ set in step 2; and the loss function is a mean square error (MSE) loss function;

$$MSE = \frac{1}{n}\sum_{i=1}^{N}\left(RUL_i - \hat{RUL}_i\right)^2 \tag{18}$$

wherein n is the number of samples, $RUL_i$ is the true value of the remaining useful life of the $i^{th}$ sample, and $\widehat{RUL}_i$ is the predicted value of the remaining useful life of the $i^{th}$ sample;

firstly, inputting the samples obtained in step 1.3 into the multi-scale hybrid attention mechanism model constructed in step 1.3 in batches to obtain the predicted value RUL, then calculating the MSE loss value, and conducting gradient update of the model using an adaptive moment estimation optimizer to complete an iterative training session; and setting the total number of model training iterations, and iteratively training the model several times;

Step 5: Predicting the Remaining Useful Life Using the Trained Model at the on-line testing stage, calculating the output value by preprocessing the data in step 1 and inputting the data into the multi-scale hybrid attention mechanism model trained in step 4 according to the real-time data collected by the aero-engine sensor, wherein the output value is the predicted value of the remaining useful life of the aero-engine and is used to provide decision-making support for ground systems, assist ground maintenance personnel in engine maintenance work, ensure aircraft safety performance or avoid waste of manpower and material resources.

2. The multi-scale hybrid attention mechanism modeling method for aero-engine remaining useful life prediction according to claim 1, wherein in step (3.2), the multi-head hybrid attention mechanism is formed by mixing a multi-head self attention mechanism and a multi-head external attention mechanism, specifically as follows:

① The multi-head self attention mechanism:

firstly, mapping the result $U \in \mathbb{R}^{n+d}$ obtained in step 3.1 as input to 3 subspaces: query Q, key K and value V through the linear layer and splitting into H attention heads respectively:

$$Q = [Q_1, Q_2, \cdots, Q_H] \tag{6}$$

$$K = [K_1, K_2, \cdots, K_H]$$

$$V = [V_1, V_2, \cdots, V_H]$$

wherein $$Q_i, K_i, V_i \in \mathbb{R}^{n\left(\frac{d}{H}\right)}$$

are the query, key and value of the $i^{th}$ attention head;

then, conducting dot product operation of the query $Q_i$ and the key $K_i$ in each attention head, performing zooming by dividing by the square root of the data dimension d, carrying out index normalization by column and then multiplying by the value $V_i$ to obtain the result of a single attention head;

finally, splicing the results of the attention heads to obtain a final result MultiHeadSelfAttention, so as to realize feature extraction of the correlation among data by the multi-head self attention mechanism at different time steps;

$$MultiHeadSelfAttention = Concat\left(\{\text{head}\}_{i=1}^{H}\right)W_O \tag{8}$$

wherein $head_i$ =SelfAttention ($Q_i$, $K_i$, $V_i$), and $W_o \in \mathbb{R}^{d+d}$ is a trainable projection matrix;

② the multi-head external attention mechanism:

firstly, mapping the result $U \in \mathbb{R}^{n\times d}$ obtained in step 3.1 as input to the query subspace Q through the linear layer and splitting into H attention heads:

$$Q = [Q_1, Q_2, \cdots, Q_H] \tag{10}$$

wherein $$Q_i \in \mathbb{R}^{n*\left(\frac{d}{H}\right)}$$

is the query of the $i^{th}$ attention head;

then, conducting dot product operation of the query and the external key memory unit $$M_k \in \mathbb{R}^{n*\left(\frac{d}{H}\right)}$$

in each attention head $Q_i$ carrying out standardization, and then multiplying by the external key memory unit $$M_V \in \mathbb{R}^{n*\left(\frac{d}{H}\right)}$$

to obtain the result of a single attention head, wherein the standardization is double normalization, that is to carry out index normalization by column and then carry out normalization by column;

finally, splicing the results of the attention heads to obtain a final result MultiHeadExternalAttention, so as to realize feature extraction of the correlation among data by the multi-head external attention mechanism at different time steps;

$$MultiHeadExternalAttention = Concat\left(\{\text{head}\}_{i=1}^{H}\right)W_O \tag{13}$$

wherein $head_i$=ExternalAttention ($Q_i$), and $W_o \in \mathbb{R}^{d*d}$ is a trainable projection matrix;

③ the multi-head hybrid attention mechanism formed by mixing a multi-head self attention mechanism and a multi-head external attention mechanism, specifically as follows:

firstly, setting a trainable parameter $\alpha \in \mathbb{R}^{1*2}$, wherein $\alpha=[\alpha_1, \alpha_2]$ and the initial value is 1, then carrying out index normalization, and finally, using the parameter to conduct weighted summation of the feature MultiHeadSelfAttention extracted by the multi-head self attention mechanism and the feature MultiHeadExternalAttention extracted by the multi-head external attention mechanism to obtain a final result HybridAttention:

$$HybridAttention = \frac{\exp(\alpha_1)}{\exp(\alpha_1)+\exp(\alpha_2)} MultiHeadSelfAttention + \frac{\exp(\alpha_2)}{\exp(\alpha_1)+\exp(\alpha_2)} MultiHeadExternalAttention. \quad (14)$$

* * * * *